No. 755,819. PATENTED MAR. 29, 1904.
P. G. WATMOUGH, Jr.
INDUCTION MOTOR.
APPLICATION FILED SEPT. 2, 1902.
NO MODEL.
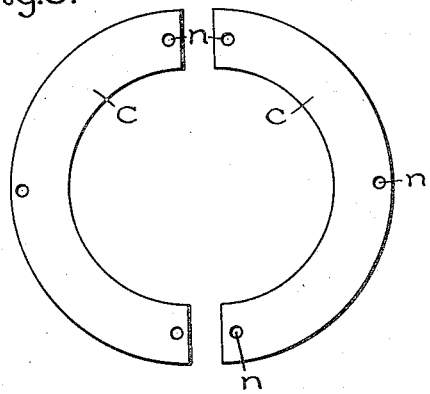
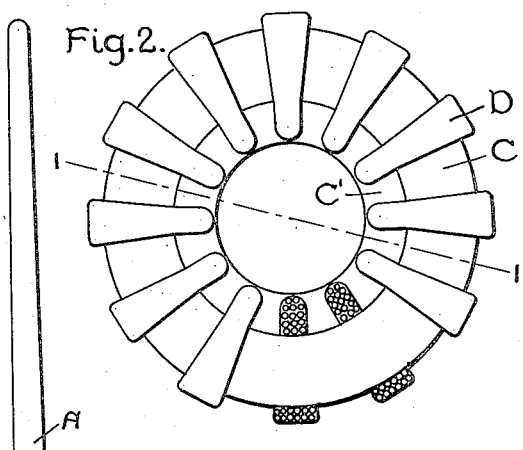
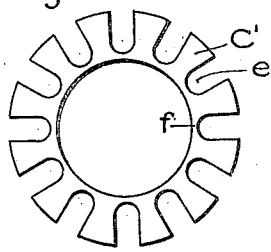
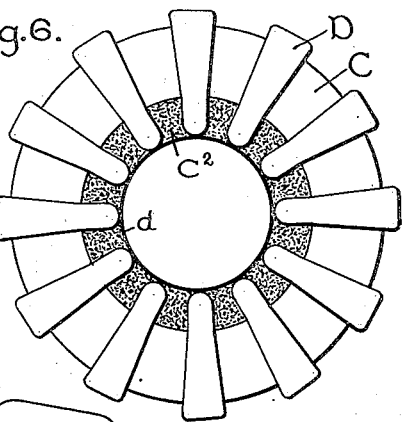
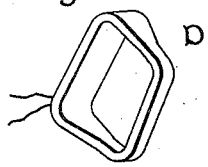
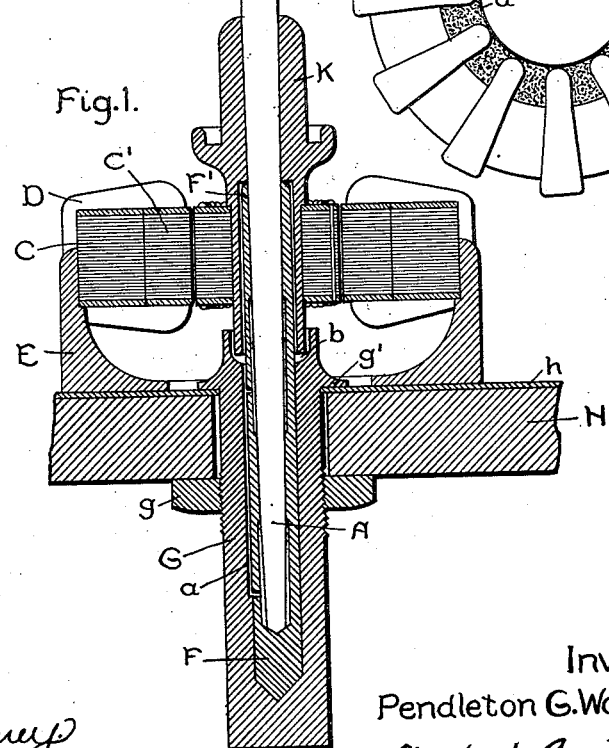
Witnesses.
Inventor.
Pendleton G. Watmough Jr.
by Albert S. Davis
Atty.

No. 755,819. Patented March 29, 1904.

UNITED STATES PATENT OFFICE.

PENDLETON G. WATMOUGH, JR., OF SCHENECTADY, NEW YORK, ASSIGNOR TO GENERAL ELECTRIC COMPANY, A CORPORATION OF NEW YORK.

INDUCTION-MOTOR.

SPECIFICATION forming part of Letters Patent No. 755,819, dated March 29, 1904.

Application filed September 2, 1902. Serial No. 121,715. (No model.)

*To all whom it may concern:*

Be it known that I, PENDLETON G. WATMOUGH, Jr., a citizen of the United States, residing at Schenectady, in the county of Schenectady, State of New York, have invented certain new and useful Improvements in Induction-Motors, of which the following is a specification.

My invention relates to improvements in the construction of induction-motors, and more particularly to induction-motors of the polyphase type used in connection with electrically-operated spindles of spinning machinery in which an individual electric motor is used for driving each spindle, the rotor of said motor being mounted directly on the spindle and surrounded by a stator.

The object of my invention is to simplify the construction and reduce the cost of motors of the type above described. The stator of these small motors is usually composed of an annular laminated core, on which the coils are wound, the number of coils depending upon the speed required and the frequency of the current. In order to have as small an air-gap as possible between the stator and the rotor, so as to diminish the reluctance of the magnetic circuit, it has been customary to thread the coil-windings through holes in the laminated core, constituting what is known as a "tunnel" winding, or to lay the winding into slots in the core. In building small motors, where the cost must be reduced to a minimum, these modes of winding are too slow to be practical.

My invention makes it possible to build a small motor at low cost both in time and material.

The invention consists in an induction-motor having a laminated annular stator-core composed of main and intermediate portions, the main portion being formed in halves, so that coils made on a former can be slipped onto each half, said coils standing in radial lines on said portion. The halves of this portion are then joined to form a circular structure, and the intermediate portion, consisting of annular laminations having external teeth to fit between the inwardly-projecting coils, is then slipped into place inside of and concentric with the main portion, the ends of the teeth fitting snugly against said main portion. The inner ends of the coils are thus completely surrounded by the laminations and the coils are held securely in position at equal distances apart. After the parts have been assembled the inner edges of the laminations composing the intermediate annular core portion are turned off smooth and cylindrical, so as to leave as little metal as possible over the inner ends of the coils.

In the accompanying drawings, Figure 1 is a vertical section of my improved form of motor as applied to a spindle of a spinning-machine, the section through the stator being taken on the line 1 1 of Fig. 2. Fig. 2 is a plan view of my preferred construction of the stator, showing the relative positions of the formed coils and the main and intermediate core portions. Fig. 3 is a plan view of the halves of a main lamination of the stator-core. Fig. 4 is a plan view of one of the intermediate laminations thereof. Fig. 5 is a perspective view of one of the formed coils, and Fig. 6 is a plan view of a modified form of stator.

Referring now to Figs. 1 to 5, inclusive, A represents the blade of the spindle of a spinning-machine on which a bobbin is to be mounted. Rigidly fastened to this blade is a cup K, on which the armature or rotor of the motor is assembled, the said armature or rotor being preferably built up of laminated punchings and electrical conductors which constitute the well-known squirrel-cage type of armature. However, any type of induction-motor armature may be used. The lower end of the blade A rotates in and is supported by a step-bearing F, the said step being either rigidly or rotatably mounted in the cup-shaped base G, which is supported by the bolster-rail H, which forms part of the spinning-machine. Below the cup K the blade is rotatably supported by the bolster-bearing F'. The cup-shaped base G is held in place rigidly by the clamping action of the nut $g$, which bears against the under side of the rail H, and the flange $g'$, which bears on the top of the plate $h$, which in turn is supported by rail H. The stator, which comprises the annular laminated core composed of the main laminations C, the intermediate laminations C', and the formed coils D, which are mounted on the said core in the manner to be hereinafter described, is mounted on the rail H by means of an annular supporting-piece E. An oil-cup $b$, from which the passage-way $a$ leads to the step-bearing above referred to, is provided in the cup-shaped base G.

The operation of assembling the various parts of the stator will now be described. Laminated punchings, preferably of the semicircular form shown in Fig. 3, having holes $n$ therethrough for the purpose of receiving binding-bolts, are assembled to form the main portion of the core. The formed coils of wire D (shown in perspective in Fig. 5) are then slipped on each half and the halves are bolted together. Then the intermediate laminations C', which are punchings of the shape shown in Fig. 4, are forced into the position shown in Fig. 2, thereby causing the inwardly-projecting edges or sides of the coils D to enter the serrations $e$ of the intermediate laminations to hold the said coils in place and prevent their movement angularly of the core. In forming the intermediate laminations C' it is advantageous to make the thickness of the metal between the inner edge of the coils D and the rotor, as at $f$ in Figs. 2 and 4, as small as possible consistent with necessary strength for the reasons stated above. The punchings may be made with the thickness of the metal at $f$ relatively great, and after the core has been assembled this thickness may be reduced by milling.

In Fig. 6 I have shown a modification of my invention, using instead of the intermediate laminations C' a packing $C^2$ of iron-filings, cemented together in any suitable manner, preferably by a metallic cement, which will set when cold or dry, which will resist heat, and will not occupy much space between the particles of iron. The said packing of iron-filings is held in place while hardening and protected from injury after hardening by means of the thin sheet-iron bushing $d$.

In the operation of the motor the coils D are connected up to a source of alternating current, so as to produce a rotating magnetic field in the core of the stator, thereby causing a rotation of the rotor by currents induced in said rotor.

Although I have shown and described my invention as applied to a spindle of a spinning-machine, I do not intend to limit myself to such an application, as my improvement is applicable to induction-motors generally.

What I claim as new, and desire to secure by Letters Patent of the United States, is—

1. In an induction-motor, a stator having an annular core, coils of wire which have previously been formed into the desired shape and slipped on said core, and means forming part of the magnetic circuit of said stator for maintaining said coils in radial planes on said annular core.

2. In an induction-motor, a stator having a core composed of laminated punchings assembled to form an annular ring, formed coils of wire carried by said core, and means forming part of the magnetic circuit of said stator for maintaining said coils in radial planes.

3. In an induction-motor, a stator or primary member having a core comprising laminated punchings of such a shape that when assembled they form an annular ring, coils of wire which have been previously formed into the shape desired and slipped onto said core, and means forming part of the magnetic circuit of said stator for maintaining said coils in radial planes.

4. In an induction-motor, a stator having a core comprising a main portion formed of laminated punchings assembled to form an annular ring, formed coils of wire placed on said main portion, and means for maintaining said coils in radial planes, said means comprising intermediate annular punchings of less diameter than those forming the main core portion and forming part of the magnetic circuit of said stator.

5. A stator for an induction-motor comprising a main core portion built up of laminated punchings which when assembled form an annular ring, coils of wire previously formed to fit said punchings and adapted to be placed thereon before the parts of the same are assembled, the inner sides of said formed coils projecting radially inward, and intermediate annular punchings having serrated edges, the serrations of which are adapted to receive the inwardly-projecting ends of said coils and hold the coils in position and form part of the magnetic circuit.

6. An induction-motor having an annular laminated field-core comprising a main portion made in halves, coils made in a former and slipped on said main core portion, and intermediate annular laminations adapted to hold said coils in position in radial planes and form part of the magnetic circuit.

7. An induction-motor having an armature or rotor, an annular laminated field-core comprising a main portion made in halves, coils made in a former and slipped on said main core portion, and intermediate annular laminations having serrated edges, said serrations being constructed to receive the inwardly-projecting sides of said coils so as to hold the same in place and form part of the magnetic circuit.

8. An induction-motor having an armature or rotor, an annular laminated field-core comprising a main portion made in halves, coils made in a former and slipped on said main portion, and intermediate annular punchings having serrated edges, said serrations being constructed to receive the inwardly-projecting sides of said coils so as to hold the same in place the thickness of metal between the inner edges of each of said coils and the rotor being made as small as possible.

9. The combination with a spindle, of an induction-motor rotor attached thereto, an annular stator surrounding said rotor, said stator being so constructed of laminated punchings as to allow the threading on of formed coils, and means for fastening said coils in radial planes relative to said spindle.

10. An induction-motor having an annular core composed of main and intermediate portions, the former being adapted to receive formed coils, and the latter to inclose the inner portion of said coils and complete the magnetic circuit.

In witness whereof I have hereunto set my hand this 28th day of August, 1902.

PENDLETON G. WATMOUGH, JR.

Witnesses:
GEORGE F. CHISM,
E. KNICHLING.